United States Patent [19]

Malacheski et al.

[11] 4,254,537
[45] Mar. 10, 1981

[54] LINE TIGHTENER

[76] Inventors: Joseph J. Malacheski; Richard J. Zenda, both of 32 Warner St., Wilkes-Barre, Pa. 18703

[21] Appl. No.: 887,784

[22] Filed: Mar. 17, 1978

[51] Int. Cl.³ .............................................. A44B 21/00
[52] U.S. Cl. .................................................... 24/71.3
[58] Field of Search ...................... 24/71.3, 71.2, 71.1; 211/119.5

[56] References Cited

U.S. PATENT DOCUMENTS

| 1,792,468 | 2/1931 | Smeckels et al. | 24/71.3 |
| 2,597,210 | 5/1952 | Walters | 24/71.3 |
| 2,679,082 | 5/1954 | Himberger | 24/71.3 |
| 3,568,261 | 3/1971 | Korb | 24/71.3 |
| 3,879,805 | 4/1975 | Gretter | 24/71.3 |

FOREIGN PATENT DOCUMENTS 507909  9/1920  France ...................... 24/71.3

Primary Examiner—Alexander Grosz
Attorney, Agent, or Firm—Robert K. Youtie

[57] ABSTRACT

A line tightener wherein is provided a shank about which line can be wound for taking up, a transverse extension on one end of the shank, and a receiver on the distal end of the extension for receiving a region of the line spaced from the wound portion to resist unwinding of the line.

7 Claims, 12 Drawing Figures

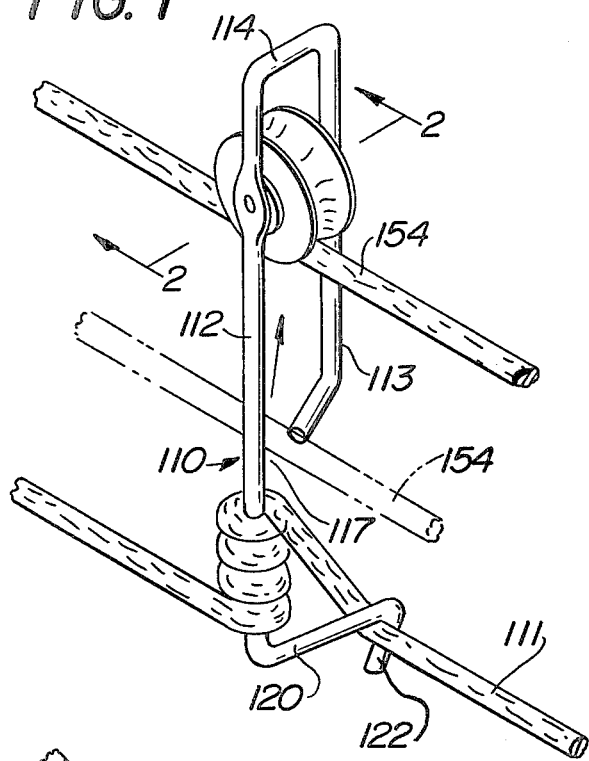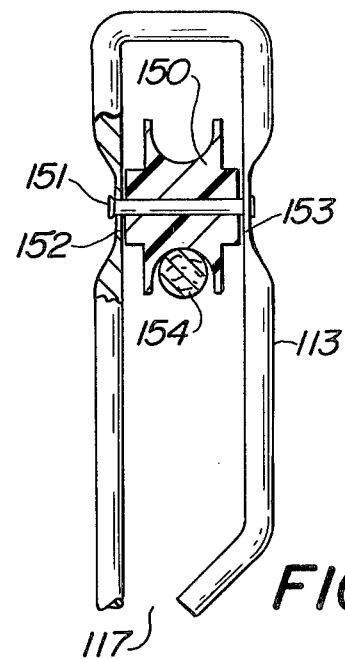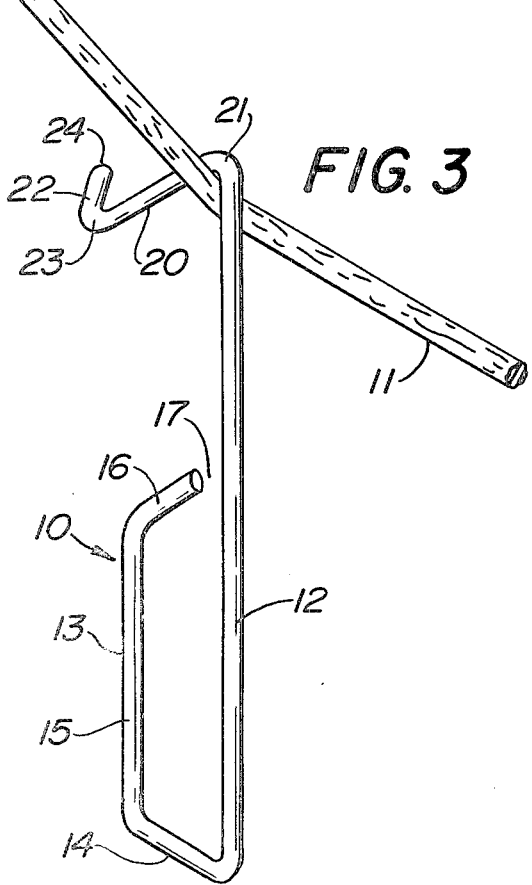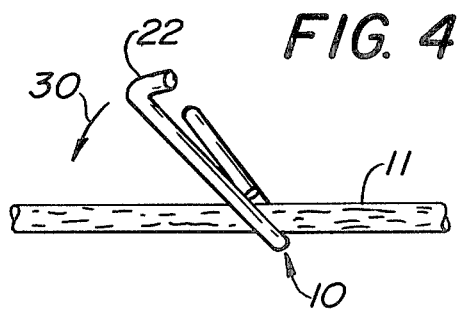

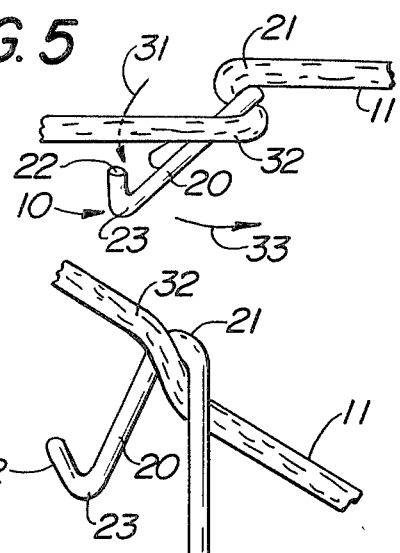
FIG. 5
FIG. 6
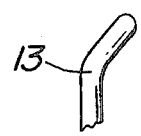
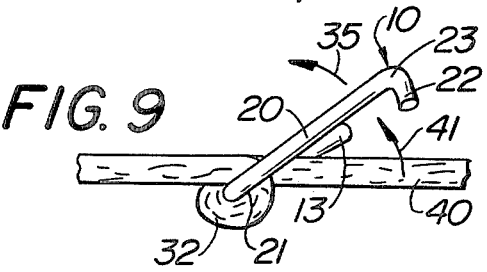
FIG. 9
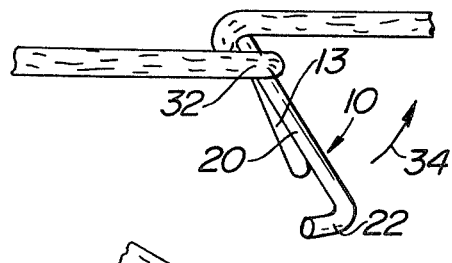
FIG. 7
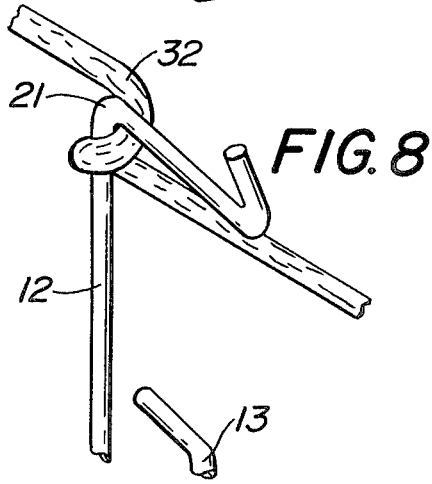
FIG. 8
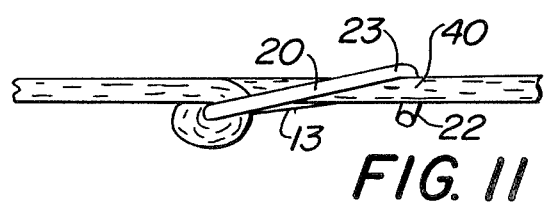
FIG. 11
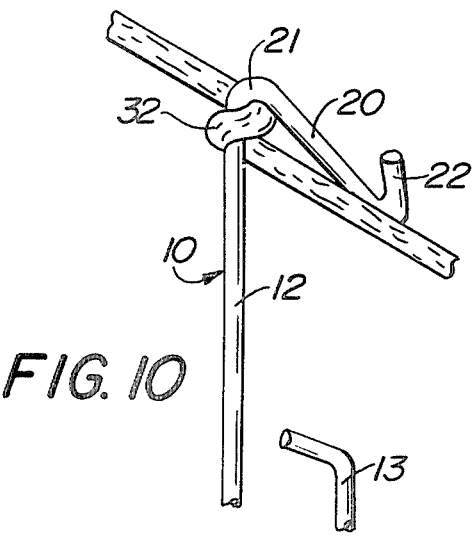
FIG. 10
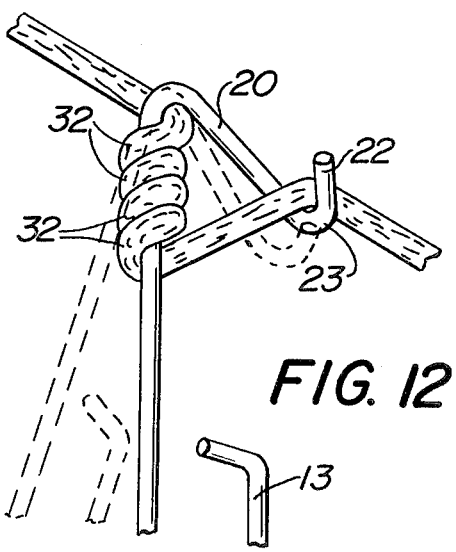
FIG. 12

LINE TIGHTENER

BACKGROUND OF THE INVENTION

While there have, in the past, been proposed a variety of devices for tightening and taking up on line, such devices have generally been relatively complex in construction, requiring expensive manufacture and complicated operating procedures, and lacking in requisite durability and reliability in use.

SUMMARY OF THE INVENTION

It is, therefore, an important object of the present invention to provide a line tightening device which overcomes the above-mentioned difficulties of the prior art, is extremely simple in construction to enable manufacture by economic mass production methods, staunch and durable for useful life of great duration, and which is extremely simple to operate, even for young children with minimal instruction.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view showing a line tightener of the present invention in an operative condition of use.

FIG. 2 is a partial sectional elevational view taken generally along the line 2—2 of FIG. 1.

FIG. 3 is a perspective view showing another embodiment of line tightener of the present invention in an early stage of line tightening operation.

FIG. 4 is a top plan view of the embodiment shown in FIG. 3.

FIG. 5 is a view similar to FIG. 4 showing a slightly later stage in the procedure.

FIG. 6 is an elevational view of the apparatus and operation shown in FIG. 5.

FIG. 7 is a top view similar to FIGS. 4 and 5 but showing a later stage in the operation.

FIG. 8 is an elevational view showing the apparatus in the condition of FIG. 7.

FIG. 9 is a top view similar to FIG. 7, but showing still a later operative condition.

FIG. 10 is an elevational view showing the condition of FIG. 9.

FIG. 11 is a top view showing a final operative condition of the instant line tightener.

FIG. 12 is an elevational view showing the operative condition of FIG. 11.

DESCRIPTION OF THE PREFERRED EMBODIMENTS

Referring now more particularly to the drawings, and specifically to FIGS. 3 and 4 thereof, a line tightener of the present invention is there generally designated 10, illustrated in operative associated with a flexible elongate filament, rope or line 11.

The line tightener 10 may advantageously be integrally fabricated from a single length of wire or rod stock, suitably bent and cut to define the several components.

The line tightener 10 may include a generally straight, elongate portion 12 defining a shank. From one end of the shank 12, the lower end as seen in FIG. 3, extending integrally therefrom, may be a handgrip or handle 13. In particular, the handle 13 may include a rod portion 14 extending generally transversely from one end of the shank 12, a generally longitudinal portion 15 extending from the transverse portion 14 remote from the shank, and generally longitudinally thereof toward the opposite shank end. From the longitudinal handle 13, remote from the transverse handle portion 14, may extend a terminal handle portion 16, which may project generally toward and terminate short of an intermediate region of the shank 12, being spaced therefrom as at 17. Thus, the handle 13 generally defines at one end of the shank 12 a loop having an access opening 17.

Extending from the other end of the shank 12, in oblique or transverse relation with respect thereto, is an extension 20. That is, the extension 20 is integral with the shank 12, merging smoothly therewith as by the acute angle bend 21, so that the extension 20, being generally straight, defines a generally acute angle with the shank 12. The bend 21 defines an arc of an angular extent supplementary to the included angle between shank 12 and extension 20. The smoothly arcuate bend 21 and its smooth mergence with both the extension 20 and shank 12 is important to operation of the instant line tightener, as will become apparent more fully hereinafter.

For use in the tightening of clothesline, the instant tightener 10 may be on the order of magnitude of about six inches in overall length, while the handle 13 may occupy about three inches of the overall length. The transverse extension 20 may define roughly about a 45° angle with the shank 12, and extend about one inch or more laterally from the shank. Provided on the distal or outer end of shank 20 may be an integral terminal portion or stub 22, joined to the shank 20 by a bend or bight 23 and disposed to define with the shank 20 an acute included angle. That is, the bend or bight 23 is smoothly curved and smoothly merges integrally at its opposite ends with respective shank 20 and stub 22, so that there is defined by the bend 23 and stub 22 a generally longitudinally outwardly facing receiver, for purposes appearing more fully hereinafter. The stub 22 terminates at a free end 24 generally longitudinally short of the adjacent end of shank 12, as defined by bend 21, which condition is best seen in the elevational views of FIGS. 6, 8, 10 and 12. Further, the terminal portion or stub 22 extends in an angular relation with respect to the plane of shank 12 and extension 20, so as to be askew with respect to the shank. Hence, the bight or receiver 22, 23 may face generally longitudinally of the shank and be inclined slightly laterally thereof, as may be apparent from the top views of FIGS. 5, 7, 9 and 11.

Considering now the operative procedure of the instant invention, it will be apparent in FIG. 3 that the line tightener 10 is disposed generally vertically with the line 11 extending generally transversely of the shank 12 and received on the underside of extension 20 within the bight of bend 21. This condition is also shown in FIG. 4, wherein is shown an arrow 30 indicating the direction of rotation of the tightener 10 generally about the longitudinal access of shaft 12. As the terminal rod portion or stub 22 is spaced generally below the bend 21, the stub passes beneath the line 11, as indicated by arrow 31 in FIG. 5, where it is also seen that a line portion 32 rides upwardly along the upper surface of inclined extension 20. Continued rotation of tightener or tool 10 in the direction of arrow 33 will effect continued riding upwardly of the line portion 32 along the upper surface of inclined extension 20 onto the top of smoothly convexly curved bend 21, the condition shown in FIGS. 7 and 8.

In FIG. 7 is shown a further arrow 34 indicating continued rotation of the tool 10 in the same angular direction. Such continued movement to the condition of FIGS. 9 and 10 will cause the line portion 32 to ride beyond the extension 20 and bend 21 to define an initial convolution coiled about the shank 12.

The above-described procedure may be repeated any desired number of times, as by continued rotation of the tightener tool 10 in the direction of arrow 35 in FIG. 9 to produce any desired number of convolutions of line would about the shank 12. Such a number of convolutions are shown in FIG. 12.

To prevent unwinding, it is only necessary to place a line portion 40, adjacent to and spaced from the initial or lowermost convolution 32, over the stub 22 and extension 20 into the opening of receiver defined by stub 22 and bend 23. That is, the line portion 40 spaced from the wound line portion 32 is displaced, as in the direction arrow 41 in FIG. 9, for location in receiver 22, 23, as shown in FIGS. 11 and 12. The wound line 11 in this condition is self-holding. This procedure is simply accomplished by swinging the handle from the upright position of FIGS. 9 and 10, in the manner of a lever to the phantom position of FIG. 12, and returning to the solid line position with the line portion 40 engaged in receiver 23.

Often lines to be tightened extend in parallel pairs, as with clotheslines over pulleys, and it may be desired to support one line with the other. This can be readily accomplished by placing the other line of a pair into the loop of handle 13, as through opening 17.

In the embodiment shown in FIGS. 1 and 2, a line tightening device or tool is generally designated 110, and may include an elongate shank 112 from one end of which may project a transverse extension 120, projecting from the lower end as shown in FIG. 1. From the outer, remote or distal end of extension 120, there may project a terminal portion or stub 122, extending generally longitudinally of the shank 112.

In practice, the shank 112, extension 120, and stub 122 may be the same as the shank 12, extension 20 and stub 22 of the first described embodiment, and operate in the same manner.

Extending from the shank 112, remote from the extension 120 may be an open loop or handle 113 corresponding to the handle 13 of FIG. 3. While the extension 20 may approach the plane of handle 13 in FIG. 3, the extension 120 of FIG. 1 is generally normal to the plane of handle 113. Mounted in the loop 113 may be a rotatable member or pulley 150, say being journaled on a pin 151 extending between opposed regions 152 and 153 of the loop. That is, the opposed loop regions 152 and 153 may be flattened or swaged, if desired and the pin 151 mounted to extend between the opposed portions 152 and 153 for rotatably supporting the pulley 150. By the transverse disposition of handle 113 relative to extension 120, the pulley 150 is properly located for rolling engagement with the line portion 154.

In operation, the pulley 150 will provide a frictionless surface for engaging a line portion 154 to maintain the latter line portion generally close to the line 111 coiled about the shank 112. The pulley 150 is generally in the plane of lines 111 and 154 for rolling engagement with the latter, and line 154 may be removed from the handle 113 as shown in phantom through opening 117. The line 154 may initially be engaged inwardly through opening 117 by swinging the device 110 upwardly approximately 180° to recive the line 154 in the handle loop 113. This distributes the load between the lines for enhanced safety, prolonged wear and convenience to the user.

While the stub 22 has been illustrated as inclined in one direction with respect to the plane of shank 12 and extension 20, it is appreciated that the stub may be inclined in the other direction, if desired. Also, while the instant device has been primarily developed and employed for use in conjunction with clotheslines, it is appreciated that the device may be of larger or smaller proportions for use with lines of different sizes and uses.

From the foregoing, it is seen that the present invention provides a line tightening device which is extremely simple in structure, not requiring relative motion between parts, easy to operate, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A line tightener comprising a shank about which a line portion can be wound into convolutions to take up on a line, a transverse extension on one end of said shank extending at an acute angle to said shank, and a receiver on said extension spaced from and opening generally toward said one end of said shank for receiving a line region spaced from said line portion and said one shank end, said line region being urged by tension along the outer side of said extension toward said one shank end to tightly frictionally engage said convolutions and resist unwinding of the line from said shank.

2. A line tightener according to claim 1, in combination with a handle on said shank remote from said extension for manual operation.

3. A line tightener according to claim 1, said extension merging smoothly with said shank and said receiver comprising a stub projecting from said extension remote from said shank and combining with the adjacent portion of said extension to define a bight.

4. A line tightener according to claim 3, said stub being skew to the plane of said extension and shank to incline said bight opening generally toward one side of said extension to facilitate receiving and retaining of said line region.

5. A line tightener according to claim 1, said shank, extension and receiver being integrally fabricated of a single length of rod.

6. A line tightener according to claim 5, said shank being generally straight, and a terminal stub on said extension bent at an angle acute to the latter, the bend of said terminal stub and extension defining said receiver.

7. A line tightener according to claim 6, said terminal stub extending out of the plane of said shank and extension.

* * * * *